(12) United States Patent
Kowalczyk et al.

(10) Patent No.: US 9,523,834 B2
(45) Date of Patent: Dec. 20, 2016

(54) FIBER OPTIC ENCLOSURE

(71) Applicant: CommScope Technologies LLC, Hickory, NC (US)

(72) Inventors: Scott C. Kowalczyk, Savage, MN (US); Oscar Fernando Bran de León, Belle Plaine, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/942,129

(22) Filed: Nov. 16, 2015

(65) Prior Publication Data

US 2016/0147030 A1    May 26, 2016

Related U.S. Application Data

(63) Continuation of application No. 13/722,563, filed on Dec. 20, 2012, now Pat. No. 9,188,760.
(Continued)

(51) Int. Cl.
*G02B 6/44* (2006.01)
*G02B 6/38* (2006.01)

(52) U.S. Cl.
CPC .......... *G02B 6/4457* (2013.01); *G02B 6/3897* (2013.01); *G02B 6/4441* (2013.01); *G02B 6/4446* (2013.01);
(Continued)

(58) Field of Classification Search
CPC ..... B82Y 20/00; G02B 6/4452; G02B 6/4471; G02B 6/4454; G02B 6/4455; G02B 6/4457; G02B 6/4446; G02B 6/4472; G02B 6/3897
(Continued)

(56) References Cited

U.S. PATENT DOCUMENTS

| 1,276,825 A | 8/1918 | Swope |
| 1,442,999 A | 1/1923 | Boardman et al. |

(Continued)

FOREIGN PATENT DOCUMENTS

| DE | 42 26 368 A1 | 2/1994 |
| EP | 1 107 031 A1 | 6/2001 |

(Continued)

OTHER PUBLICATIONS

7 Inch Modules, ADC Telecommunications, Inc, © 1998, "7 Inch Connector Module with IFC", pp. 127.
(Continued)

*Primary Examiner* — Akm Enayet Ullah
(74) *Attorney, Agent, or Firm* — Merchant & Gould P.C.

(57) ABSTRACT

A fiber optic enclosure includes a housing including a base and a cover that cooperatively define an interior region of the housing; and a cable spool assembly rotatably disposed in the interior region of the housing. The cable spool includes a drum portion; and a tray assembly engaged to the drum portion and configured to rotate in unison with the drum portion when the cable spool assembly is rotated relative to the base. The tray assembly includes at least a first tray. Each tray includes optical adapters disposed in a row along a first end of the tray. Certain types of trays are pivotal relative to the drum portion along a pivot axis extending generally parallel to the row of adapters along a second end of the tray opposite the first end. Other types of trays include a second row of optical adapters that pivot relative to the first row.

20 Claims, 14 Drawing Sheets

Related U.S. Application Data

(60) Provisional application No. 61/578,960, filed on Dec. 22, 2011.

(52) U.S. Cl.
CPC ............ *G02B 6/4455* (2013.01); *G02B 6/4472* (2013.01); *G02B 6/3825* (2013.01); *G02B 6/4471* (2013.01)

(58) Field of Classification Search
USPC .................................................. 385/135–147
See application file for complete search history.

(56) References Cited

U.S. PATENT DOCUMENTS

| | | |
|---|---|---|
| 1,446,410 A | 2/1923 | McCormick et al. |
| 1,474,580 A | 11/1923 | Clark et al. |
| RE20,995 E | 2/1939 | Beasley |
| 2,502,496 A | 4/1950 | Wickman |
| 2,521,226 A | 9/1950 | Keller |
| 2,727,703 A | 12/1955 | Bonnett |
| 3,131,729 A | 5/1964 | Rudolf |
| 3,657,491 A | 4/1972 | Ryder et al. |
| 3,667,417 A | 6/1972 | Clinkenbeard |
| 3,920,308 A | 11/1975 | Murray |
| 3,940,086 A | 2/1976 | Stoquelet |
| 4,053,118 A | 10/1977 | Aikins |
| 4,081,258 A | 3/1978 | Goell et al. |
| 4,384,688 A | 5/1983 | Smith |
| 4,587,801 A | 5/1986 | Missout et al. |
| 4,635,875 A | 1/1987 | Apple |
| 4,666,237 A | 5/1987 | Mallinson |
| 4,767,073 A | 8/1988 | Malzacher |
| 4,869,437 A | 9/1989 | Berz et al. |
| 4,883,337 A | 11/1989 | Dahlgren |
| 4,913,369 A | 4/1990 | Lia et al. |
| 4,939,798 A | 7/1990 | Last |
| 4,940,859 A | 7/1990 | Peterson |
| 5,016,554 A | 5/1991 | Harris et al. |
| 5,066,256 A | 11/1991 | Ward |
| 5,074,863 A | 12/1991 | Dines |
| 5,185,843 A | 2/1993 | Aberson et al. |
| 5,265,815 A | 11/1993 | Soyka et al. |
| 5,280,861 A | 1/1994 | Corriveau |
| 5,317,663 A | 5/1994 | Beard et al. |
| 5,326,040 A | 7/1994 | Kramer |
| 5,335,874 A | 8/1994 | Shrum et al. |
| 5,494,234 A | 2/1996 | Kramer |
| 5,494,446 A | 2/1996 | DeLucia et al. |
| 5,497,444 A | 3/1996 | Wheeler |
| 5,519,275 A | 5/1996 | Scott et al. |
| 5,522,561 A | 6/1996 | Koyamatsu et al. |
| 5,544,836 A * | 8/1996 | Pera ....................... B65H 75/48 242/372 |
| 5,551,545 A * | 9/1996 | Gelfman ................ H02G 11/02 191/12.2 A |
| 5,638,481 A | 6/1997 | Arnett |
| 5,657,412 A | 8/1997 | Caudrelier |
| 5,703,990 A | 12/1997 | Robertson et al. |
| 5,709,347 A | 1/1998 | Hoffmann et al. |
| 5,717,810 A | 2/1998 | Wheeler |
| 5,718,397 A | 2/1998 | Stevens |
| 5,749,148 A | 5/1998 | White et al. |
| 5,787,219 A | 7/1998 | Muellet et al. |
| 5,915,640 A | 6/1999 | Wagter et al. |
| 5,987,203 A | 11/1999 | Abel et al. |
| 5,992,787 A | 11/1999 | Burke |
| 6,220,413 B1 | 4/2001 | Walters et al. |
| 6,315,598 B1 | 11/2001 | Elliot et al. |
| 6,367,347 B1 | 4/2002 | Blaschke et al. |
| 6,494,396 B2 | 12/2002 | Sugata |
| 6,522,826 B2 | 2/2003 | Gregory |
| 6,554,221 B2 | 4/2003 | Hinds |
| 6,591,051 B2 | 7/2003 | Solheid et al. |
| 6,616,080 B1 | 9/2003 | Edwards et al. |
| 6,643,443 B2 | 11/2003 | Holman et al. |
| 6,669,129 B1 | 12/2003 | Shah |
| 6,711,339 B2 | 3/2004 | Puetz et al. |
| 6,834,517 B1 | 12/2004 | Sheehy, Jr. |
| 6,856,748 B1 | 2/2005 | Elkins, II et al. |
| 6,915,058 B2 | 7/2005 | Pons |
| 6,937,725 B2 | 8/2005 | Liao |
| 6,997,410 B1 | 2/2006 | Huang |
| 7,000,863 B2 | 2/2006 | Bethea et al. |
| 7,011,538 B2 | 3/2006 | Chang |
| 7,016,590 B2 | 3/2006 | Tanaka et al. |
| 7,017,721 B1 | 3/2006 | Bradford et al. |
| 7,220,144 B1 | 5/2007 | Elliot et al. |
| 7,315,681 B2 | 1/2008 | Kewitsch |
| 7,346,253 B2 | 3/2008 | Bloodworth et al. |
| 7,364,108 B2 | 4/2008 | Kim et al. |
| 7,369,739 B2 | 5/2008 | Kline et al. |
| 7,397,997 B2 | 7/2008 | Ferris et al. |
| 7,400,814 B1 | 7/2008 | Hendrickson et al. |
| 7,477,829 B2 | 1/2009 | Kaplan |
| 7,522,806 B2 | 4/2009 | Hendrickson et al. |
| 7,533,841 B1 | 5/2009 | Harrison et al. |
| 7,546,018 B2 | 6/2009 | Hendrickson et al. |
| 7,676,136 B2 | 3/2010 | Wakileh et al. |
| 7,715,679 B2 * | 5/2010 | Kowalczyk .......... G02B 6/3897 242/372 |
| 7,748,660 B2 | 7/2010 | Hendrickson et al. |
| 7,756,379 B2 | 7/2010 | Kowalczyk et al. |
| 7,809,234 B2 | 10/2010 | Smith et al. |
| 7,869,682 B2 * | 1/2011 | Kowalczyk .......... G02B 6/4441 385/134 |
| 7,894,701 B2 | 2/2011 | Kowalczyk et al. |
| 8,131,126 B2 | 3/2012 | Kowalczyk et al. |
| 8,189,984 B2 | 5/2012 | Kowalczyk et al. |
| 8,229,267 B2 | 7/2012 | Kowalczyk et al. |
| 8,254,740 B2 | 8/2012 | Smith et al. |
| 8,265,447 B2 | 9/2012 | Loeffelholz et al. |
| 8,380,035 B2 | 2/2013 | Kowalczyk et al. |
| 8,422,847 B2 * | 4/2013 | Kowalczyk .......... G02B 6/4453 385/134 |
| 8,494,333 B2 | 7/2013 | Kowalczyk et al. |
| 8,494,334 B2 | 7/2013 | Kowalczyk et al. |
| 2001/0048044 A1 | 12/2001 | Sugata |
| 2002/0003186 A1 | 1/2002 | Hinds |
| 2002/0023814 A1 | 2/2002 | Poutiatine |
| 2002/0126980 A1 | 9/2002 | Holman et al. |
| 2002/0164121 A1 | 11/2002 | Brennan et al. |
| 2002/0171002 A1 | 11/2002 | Kretsch et al. |
| 2003/0037480 A1 | 2/2003 | Davis |
| 2004/0170369 A1 | 9/2004 | Pons |
| 2004/0244430 A1 | 12/2004 | Sheehy et al. |
| 2005/0213920 A1 | 9/2005 | Tanaka et al. |
| 2005/0247136 A1 | 11/2005 | Cross et al. |
| 2005/0258411 A1 | 11/2005 | Zeitler |
| 2006/0163403 A1 | 7/2006 | Dickson |
| 2006/0183362 A1 | 8/2006 | Mullaney et al. |
| 2006/0210230 A1 | 9/2006 | Kline et al. |
| 2007/0025675 A1 | 2/2007 | Kramer |
| 2007/0165995 A1 | 7/2007 | Reagan et al. |
| 2007/0189691 A1 | 8/2007 | Barth et al. |
| 2008/0035778 A1 | 2/2008 | Belden et al. |
| 2008/0037945 A1 | 2/2008 | Gniadek et al. |
| 2008/0218947 A1 | 9/2008 | Atkinson |
| 2008/0236209 A1 | 10/2008 | Conti et al. |
| 2008/0315030 A1 | 12/2008 | Hendrickson et al. |
| 2009/0190894 A1 | 7/2009 | Nhep et al. |
| 2010/0054680 A1 | 3/2010 | Lochkovic et al. |
| 2010/0090830 A1 | 4/2010 | Conti et al. |
| 2010/0166376 A1 | 7/2010 | Nair et al. |
| 2011/0094274 A1 | 4/2011 | Conti et al. |
| 2011/0222829 A1 | 9/2011 | Loeffelholz et al. |
| 2013/0094828 A1 | 4/2013 | Loeffelholz et al. |
| 2013/0170811 A1 | 7/2013 | Kowalczyk et al. |
| 2014/0010512 A1 | 1/2014 | Kowalczyk et al. |
| 2014/0010513 A1 | 1/2014 | Kowalczyk et al. |
| 2014/0105558 A1 | 4/2014 | Kowalczyk et al. |

(56) References Cited

U.S. PATENT DOCUMENTS

FOREIGN PATENT DOCUMENTS

| FR | 2 566 997 A1 | 1/1986 |
|---|---|---|
| JP | 9-236709 | 9/1997 |
| JP | 11-349230 | 12/1999 |
| JP | 2003-114339 | 4/2003 |
| JP | 2005-73365 | 3/2005 |
| JP | 2005-249858 | 9/2005 |

OTHER PUBLICATIONS

Description of Admitted Prior Art, 30 pages.
F3DF Modules, ADC Telecommunications, Inc. © 1995, "Individual 12-Pack Assemblies", pp. 90.
Fiber Cable Management Products, Third Edition, ADC Telecommunications, Inc., © 1995, 1998.
Fiber Distribution Frame, Pre-Terminated Rear Load Connector Module, Installation Instructions, ADC Telecommunications, Inc., © 2000.
Fiber Main Distribution Frame (FMDF), Fiber Terminal Block, Installation Instructions, ADC Telecommunications, Inc., © 2001.
Fiber Panel Products—Cable Management Tray Panels, ADC Telecommunications, Inc., © 1994, 1996 "72 Fiber Distribution Module (FDM) with Intrafacility Fiber Cable", pp. 56.
Fiber Panel Products, Second Edition, ADC Telecommunications, Inc., © 1994, 1996.
FL2000 Products, ADC Telecommunications, Inc., © 1994, 1996.
FL2000 Products, Adc Telecommunications, Inc., © 1994, 1996, "Rack Mount Panel with Intrafacility Fiber Cable", pp. 16.
FL2000 System—Preconfigured Panels, ADC Telecommunications, Inc., © 2000 "Rack or Cabinet Mount Termination Panel with Multifiber Cable", pp. 13.
IFC Style Frame Modules, ADC Telecommunications, Inc., © 1995, "Connector Module Equipped with IFC", pp. 27.
Next Generation Frame (NGF), Product Family Ordering Guide, ADC Telecommunications, Inc., © 1996, 1999, 2000, "Fiber Termination Blocks (FTB) Preterminated", pp. 8.
Next Generation Frame (NGF), Product Family Ordering Guide, ADC Telecommunications, Inc., © 1996, 1999, 2000.
Next Generation Frames—Fiber Termination Blocks, ADC Telecommunication, Inc., © 1998, "Fiber Termination Blocks (FTB) Preterminated" pp. 6.
Value-Added Module System, ADC Telecommunications, Inc., © 1993, 1194, 1998, "12-Pack Module Assemblies", pp. 30-31.

\* cited by examiner

//www.w3.org/1999/xhtml">
FIBER OPTIC ENCLOSURE

CROSS-REFERENCE TO RELATED APPLICATION

This application is a continuation of application Ser. No. 13/722,563, filed Dec. 20, 2012, issued as U.S. Pat. No. 9,188,760, which application claims the benefit of U.S. provisional application Ser. No. 61/578,960, filed Dec. 22, 2011, which applications are incorporated herein by reference in their entirety.

TECHNICAL FIELD

The present disclosure relates to fiber optic enclosures including rotatable cable spools at which one or more optical cables may be stored.

BACKGROUND

As demand for telecommunications increases, fiber optic networks are being extended in more and more areas. In facilities such as multiple dwelling units, apartments, condominiums, businesses, etc., fiber optic enclosures are used to provide a subscriber access point to the fiber optic network. These fiber optic enclosures are connected to the fiber optic network through subscriber cables connected to a network hub. However, the length of subscriber cable needed between the fiber optic enclosure and the network hub varies depending upon the location of the fiber optic enclosure with respect to the network hub. As a result, there is a need for a fiber optic enclosure that can effectively manage varying lengths of subscriber cable.

SUMMARY

Aspects of the present disclosure relate to fiber optic enclosures including a cable spool assembly rotatably disposed in a housing. The cable spool assembly includes a drum portion; and a tray assembly engaged to the drum portion. The tray assembly includes at least a first tray and is configured to rotate in unison with the drum portion when the cable spool assembly is rotated relative to the housing. Each tray includes a plurality of optical adapters disposed in at least a first row along a first end of the tray.

In some implementations, each tray is pivotal along a pivot axis relative to the drum portion and the pivot axis extends along a second end of the tray opposite the respective first end. In certain implementations, the pivot axis extends generally parallel to the row of adapters.

In other implementations, the first tray includes a second row of optical adapters extending along the first end of the first tray. The second row of optical adapters is pivotally connected to the first row of optical adapters.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Figure 1:
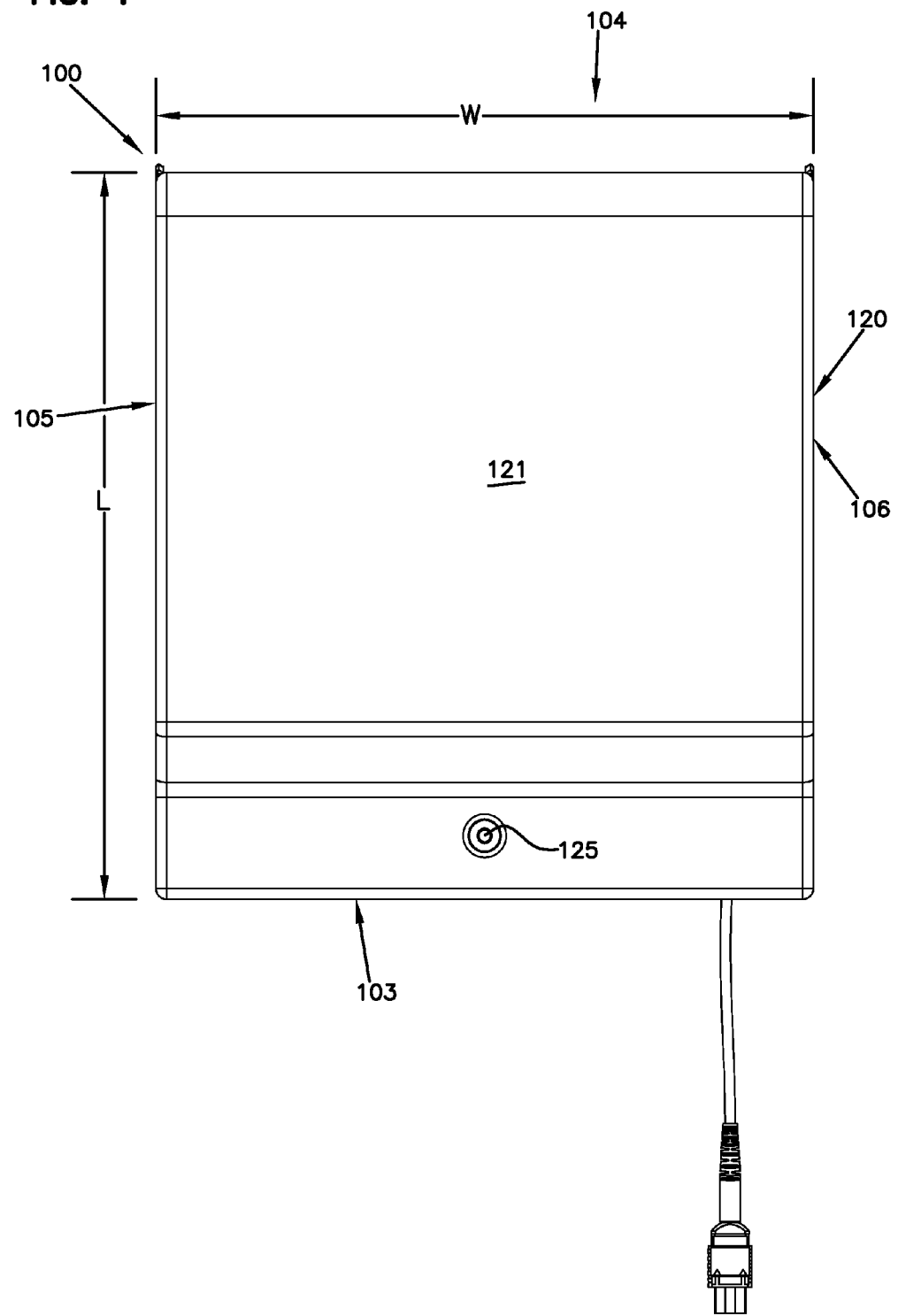
FIG. 1 is a top plan view of an example fiber optic enclosure suitable for storing slack length of a fiber optic cable with a connectorized end of the cable extending outwardly from the enclosure.
Figure 2:
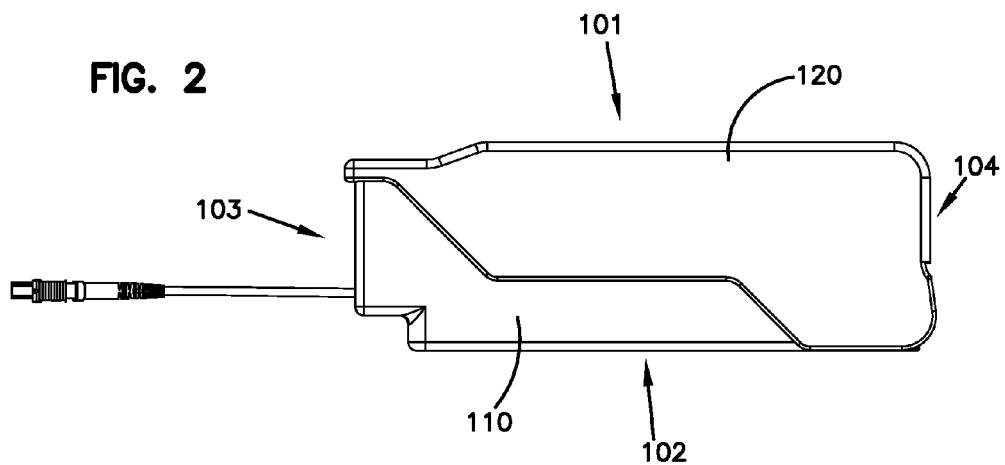
FIG. 2 is a side elevational view of the example fiber optic enclosure and cable of FIG. 1.

Reference will now be made in detail to the exemplary aspects of the present disclosure that are illustrated in the accompanying drawings. Wherever possible, the same reference numbers will be used throughout the drawings to refer to the same or like structure.

In general, a fiber optic enclosure includes a storage spool from which a first optical fiber cable may be deployed. The fiber optic enclosure also includes a termination region at which multiple subscriber fibers may be connected to fibers of the first optical fiber cable. The termination region is provided on one or more trays holding fanouts and fiber storage structures. The trays are carried by the storage spool such that the trays rotate in unison with the storage spool relative to the enclosure when cable is dispensed/deployed from the storage spool. Certain types of trays may be pivoted relative to each other. Certain other types of trays have fiber optic adapters that pivot relative to other fiber optic adapters of the trays.

In use, the fiber optic cable is wound around the storage spool and disposed within the enclosure so that a free end of the cable is disposed outside of the enclosure. Fibers of the cable are routed to one or more termination regions and connectorized ends of the fibers are plugged into rear adapter ports at the termination regions. The enclosure is deployed in the field.

A user pulls on a free end of the cable to unwind the cable from the spool and to pull the unwound length of cable out of the enclosure through a cable port. As the user pulls the cable, the cable causes the storage spool to rotate relative to the enclosure. The termination regions rotate in unison with the cable storage spool so that no strain is applied to the connectorized ends of the fibers of the fiber optic cable. The user continues pulling until a sufficient length of cable is deployed and front adapter ports at the termination region are aligned with subscriber cable ports of the enclosure.

When service is desired, the user opens the enclosure to access the termination regions within the enclosure. The user routes subscriber fibers into the enclosure through subscriber cable pass-throughs and plugs connectorized ends of the subscriber fibers into the front adapter ports at the termination region. The user may pivot some of the adapters at the termination region to a raised position to facilitate access to other adapters at the termination region. When the subscriber fibers are connected at the termination region, the user closes and optionally secures the enclosure.

FIGS. 1-15 illustrate various views of an example fiber optic enclosure 100 that is suitable for connecting at least a first optical cable to at least one subscriber fiber as described above. In certain implementations, the fiber optic enclosure 100 is suitable for connecting the first optical cable to multiple subscriber cables. In certain implementations, the fiber optic enclosure 100 is suitable for connecting multiple optical cables to multiple subscriber cables. In certain implementations, the fiber optic enclosure 100 also is suitable for storing excess cable length of the first optical cable and for enabling selective payout of the first optical cable from the enclosure 100.

The fiber optic enclosure 100 includes a housing having a top 101, a bottom 102, a front 103, a rear 104, a first side 105, and a second side 106. The enclosure 100 has a length L extending from the front 103 to the rear 104 of the housing, a width W extending from the first side 105 to the second side 106 of the housing, and a height H (FIG. 3) extending from a top 101 to the bottom 102 of the housing.

Figure 4:
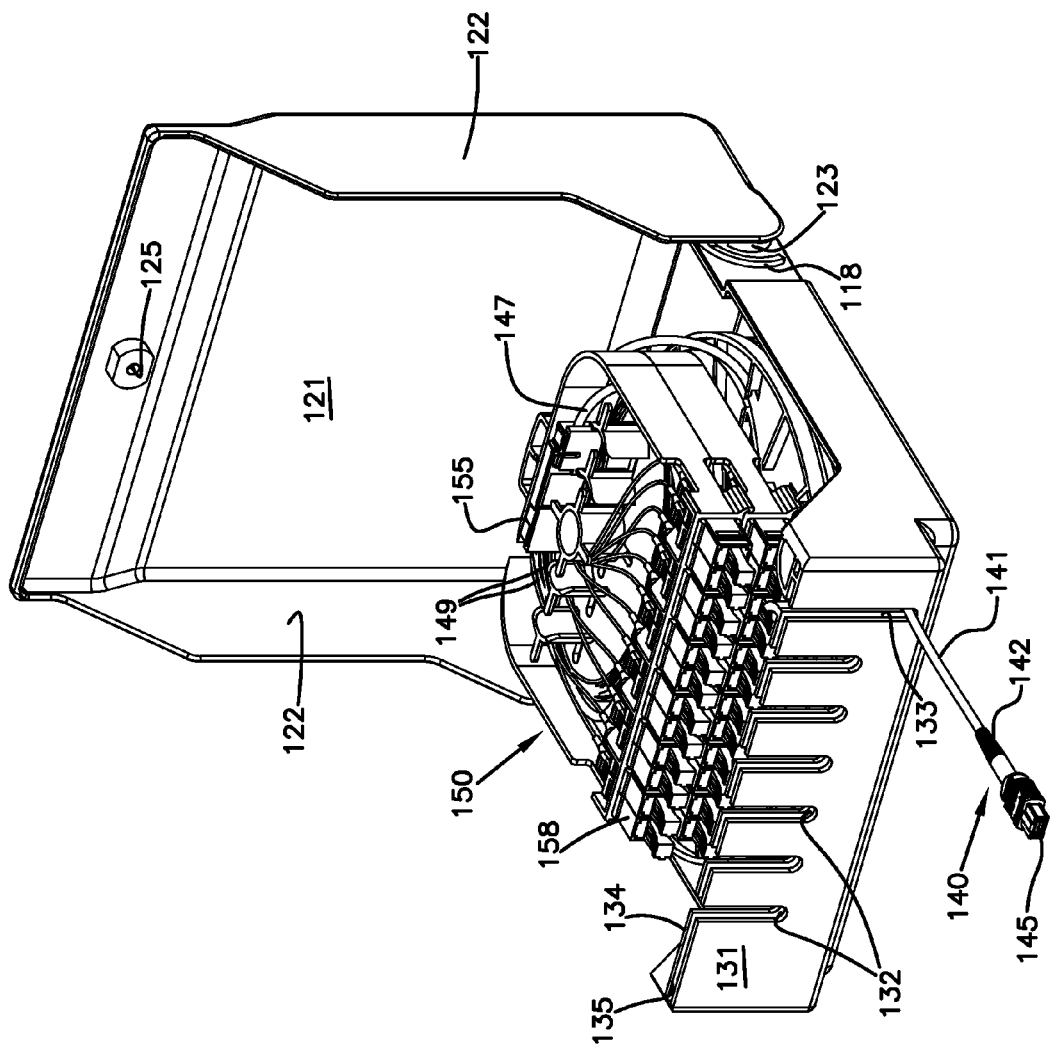
FIG. 4 is a top, front perspective view of the example fiber optic enclosure and cable of FIG. 1 with a cover moved to an open position so that a cable spool assembly is visible within the enclosure.
Figure 5:
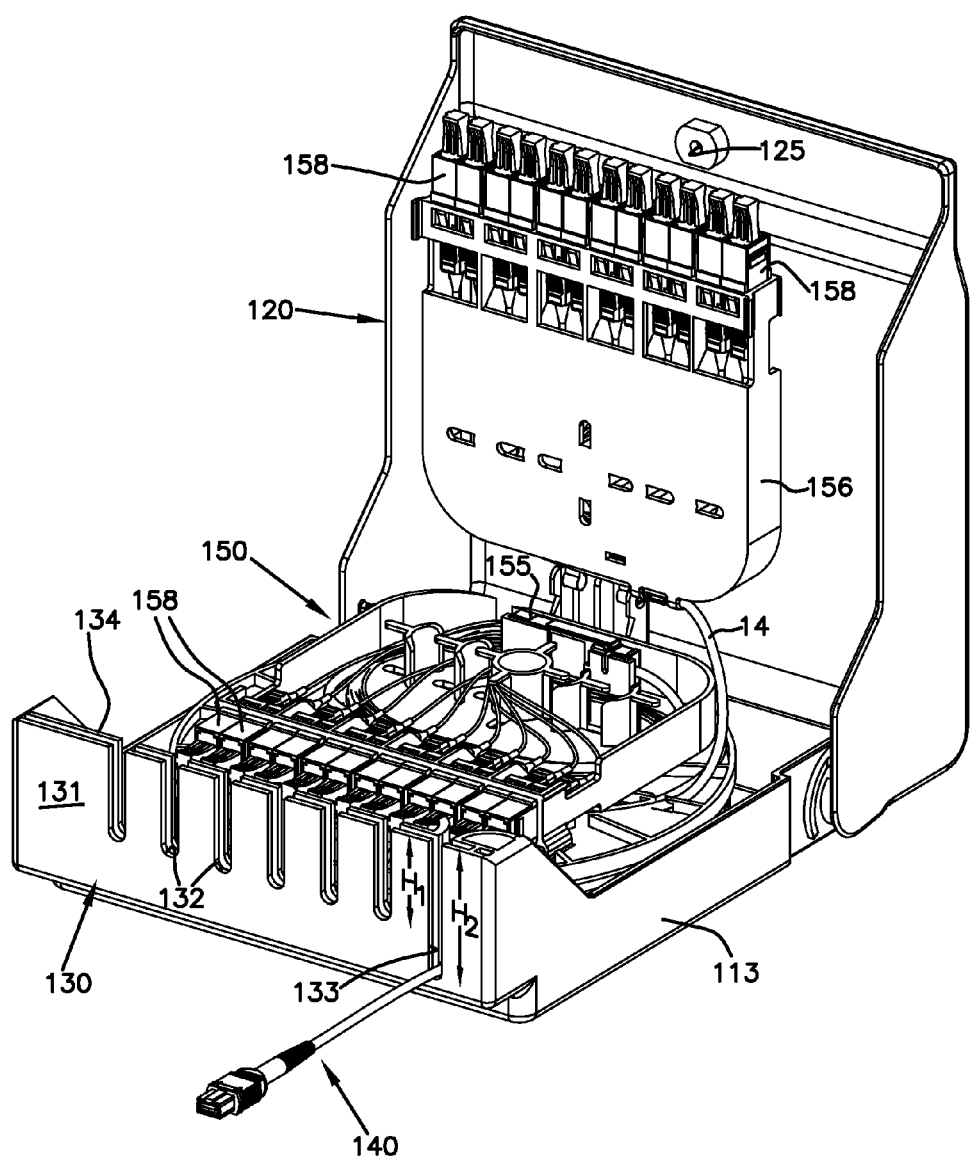
FIG. 5 is a top, front perspective view of the example fiber optic enclosure and cable of FIG. 1 with a first tray of the cable spool assembly pivoted upwardly to provide access to a second tray in accordance with aspects of the disclosure.
Figure 6:
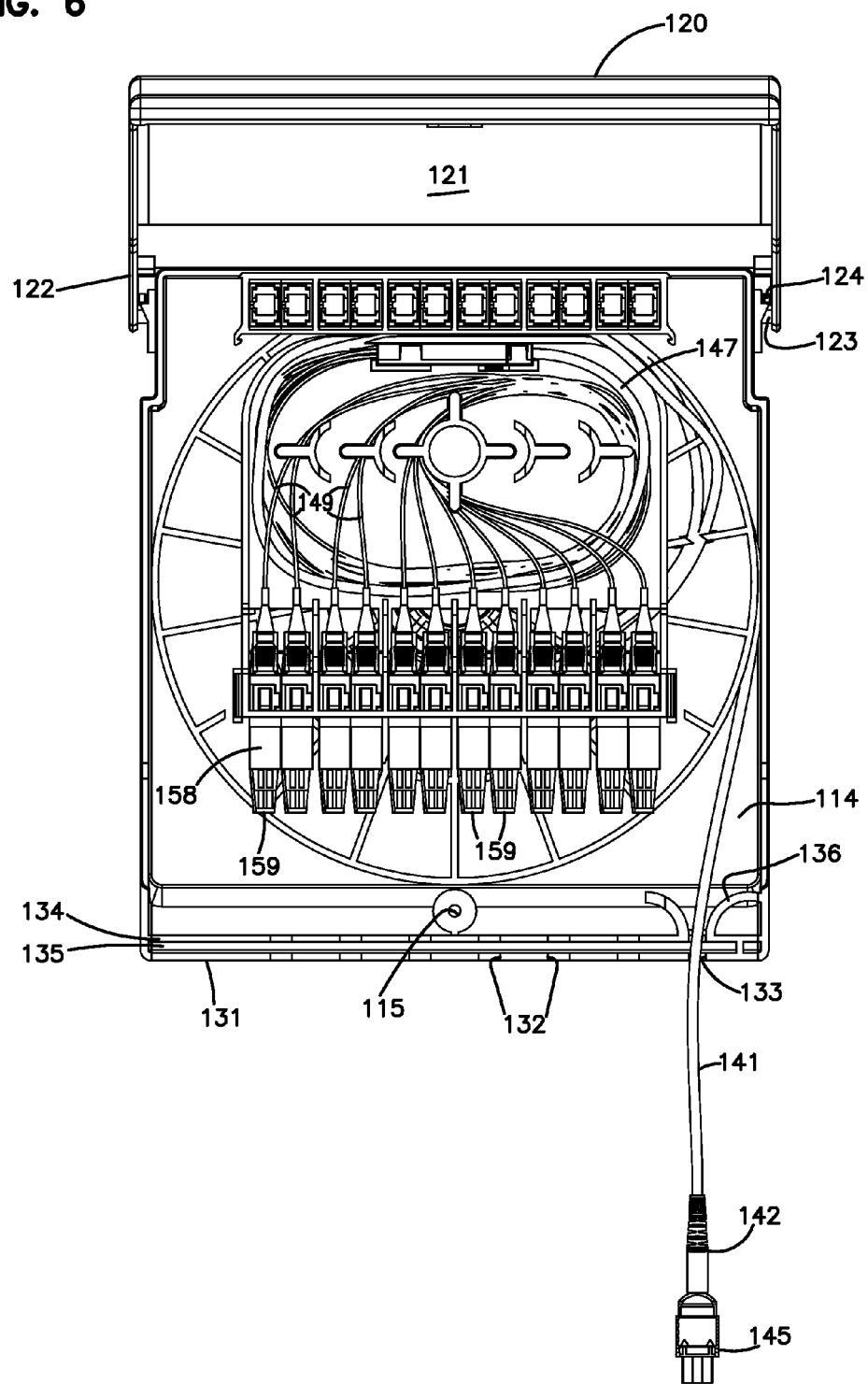
FIG. 6 is a top plan view of the example fiber optic enclosure and cable of FIG. 5.
Figure 7:
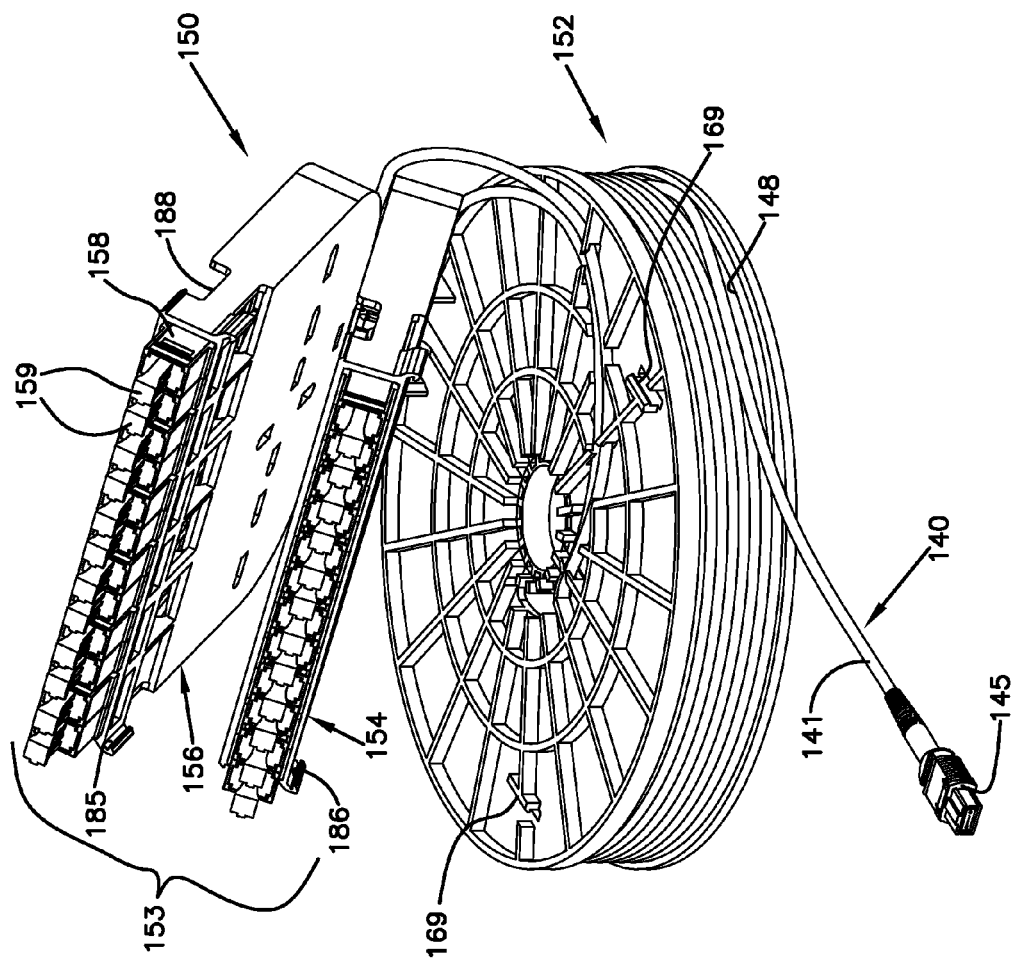
FIG. 7 is a perspective view of the cable spool assembly of FIG. 5 with both trays pivoted partially upwardly.

In some implementations, the housing includes a base 110 and a cover 120 that cooperate to define an interior 114 (FIG. 6). The base 110 defines the bottom 102 of the housing and the cover 120 defines the top 101 of the housing. The cover 120 is pivotally coupled to the base 110 to enable the cover 120 to move relative to the base 110 between a closed position (see FIGS. 1-3) and an open position (FIGS. 4-6). The cover 120 inhibits access to the interior when in the closed position and allows access to the interior when in the open position.

In certain implementations, the cover 120 is pivotally coupled to the rear of the base 110. In the example shown in FIGS. 6 and 8, each sidewall 113 of the base 110 includes a pivot hinge structure 117 disposed at the rear 104 that receives a corresponding pivot hinge structure 123 disposed on the sidewalls 122 of the cover 120 at the rear 104. In certain implementations, each sidewall 113 of the base 110 also includes a latching structure 118 that cooperates with a stop 124 disposed on the cover sidewalls 122 to hold the cover 120 in the open position relative to the base 110 after the cover 120 has been moved to the open position.

Figure 8:
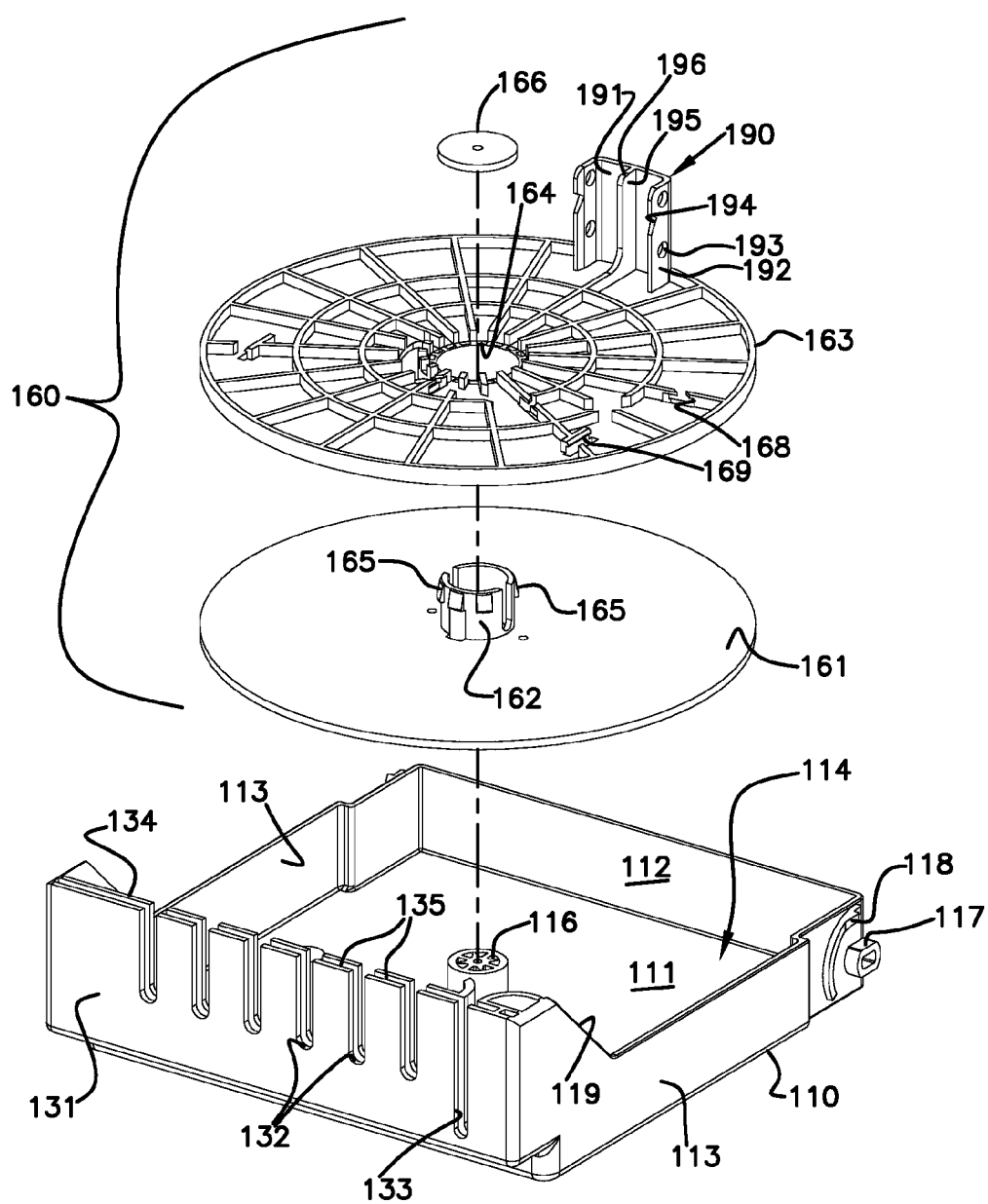
FIG. 8 is a perspective view of a drum portion of the cable spool assembly of FIG. 7 with the drum components exploded outwardly from a base of the housing.

As shown in FIG. 8, the base 110 includes a rear wall 112 and opposing side walls 113 extending upwardly from a bottom surface 111. The front 103 of the base 110 includes an entrance/exit wall arrangement 130 defining one or more cable ports 132 through which subscriber cables may extend. As shown in FIG. 4, the cover 120 includes a rear wall and side walls 122 extending downwardly from a top surface 121. The entrance/exit wall arrangement 130 defines a majority of the front side 103 of the enclosure housing and the rear wall of the cover 120 defines a majority of the rear side 104 of the enclosure housing.

In certain implementations, the sidewalls 113 of the base 110 are higher towards the front 103 of the enclosure housing and lower towards the rear 104 of the housing. In certain implementations, the sidewalls 113 taper downwardly from the front to the rear. In the example shown, the taper occurs towards the front 103 of the enclosure 100. Accordingly, when the cover 120 is opened, the higher front portions of the sidewalls 113 protect components at the front of the enclosure 100 (e.g., at the entrance/exit wall arrangement 130) and the lower intermediate and rear portions of the sidewalls 113 facilitate access to components disposed in the interior 114 of the enclosure 100.

In some implementations, the cover 120 can be secured in the closed position relative to the base 110. In certain implementations, the base 110 and the cover 120 define locking channels 115, 125 that align when the cover 120 is closed relative to the base 110. A fastener (e.g., a screw) may be inserted through the locking channels 115, 125 to lock the cover 120 in the closed position. In other implementations, the cover 120 may be latched to the base 110. In still other implementations, a lock (e.g., a pad lock) may be inserted through the locking channels 115, 125 to hold the cover 120 in the closed position.

Figure 3:
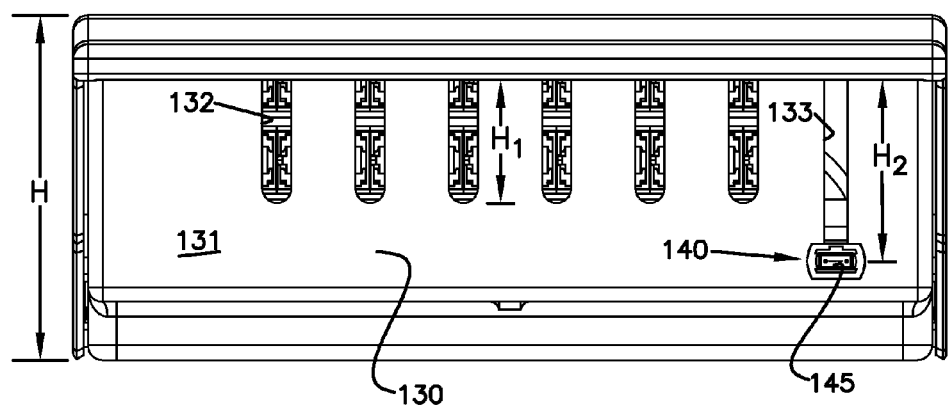
FIG. 3 is a front elevational view of the example fiber optic enclosure and cable of FIG. 1.

As shown in FIGS. 3 and 8, the entrance/exit wall arrangement 130 defines subscriber cable ports 132 for the subscriber cables to enter and/or exit the enclosure 100. In the example shown, the entrance/exit wall arrangement 130 defines six subscriber cable ports 132 (i.e., subscriber cable pass-throughs). In other implementations, the entrance/exit wall arrangement 130 may define a greater or lesser number of subscriber ports 132. The entrance/exit wall arrangement 130 also defines a main cable port 133 (i.e., a main cable pass-through) through which one or more optical cables 140 may pass (e.g., see FIG. 4). In the example shown, the main cable port 133 is disposed at one end of the subscriber cable ports 132.

In the example shown, the cable ports 132, 133 define elongated slots in the front 103 of the enclosure 100 extending in a top-bottom direction. In some implementations, the subscriber cable ports 132 extend along a height H1 and the main cable port 133 extends along a height H2 that is larger than H1. In the example shown, the main cable port 133 extends along a majority of the height H of the enclosure 100 and the subscriber ports 132 extend along less than a majority of the height H of the enclosure 100. In other implementations, however, the subscriber ports 132 may extend along a majority of the height H of the enclosure 100.

In certain implementations, a sealing arrangement is disposed at the cable ports 132, 133 to inhibit ingress of dirt, water, or other contaminants into the enclosure 100. In the example shown, the entrance/exit wall arrangement 130 includes a first wall 131 spaced from a second wall 134 to provide a gap 135 in which a gasket or other seal may be disposed. The gasket is formed from a flexible polymer or other sealing material that compresses against the subscriber fibers as the subscriber fibers exit the enclosure 100. In certain implementations, the gasket also compresses against the first optical cable 140 as the optical cable 140 passes through the port 133.

In some implementations, a guiding structure 136 is disposed at an inside of the entrance/exit wall arrangement 130 to lead the fiber optic cable 140 to the cable port 133 and to inhibit excessive bending of the first optical cable 140. In the example shown in FIG. 6, the guiding structure 135 includes two curved surfaces that extend rearwardly and outwardly from the rear of the second wall 134 on either side of the slot 133. In certain implementations, fiber guides also may be provided at the slots 132 for the subscriber fibers.

FIGS. 7-15 illustrate one example cable spool assembly 150 suitable for use in the fiber optic enclosure 100 disclosed above. The example cable spool assembly 150 includes a drum portion 152 and a tray assembly 153 mounted to the drum portion 152. The drum portion 152 includes a cable storage spool 160 that rotatably mounts to the base 110 (see FIG. 8). The tray assembly 153 includes at least a first tray 154. In certain implementations, the tray assembly 153 includes multiple trays. In the example shown, the tray assembly 153 includes the first tray 154 and a second tray 156. The tray assembly 153 is configured to rotate in unison with the drum portion 152 when the cable spool assembly 150 is rotated relative to the base 110.

A first end 141 of the cable 140 extends outwardly from the spool 160. When the cable spool assembly 150 is disposed in the fiber optic enclosure 100, the cable 140 passes through the cable port 133 so that the first end 141 is disposed outside the enclosure 100. In certain implementations, the first end 141 of the cable 140 is terminated by a fiber optic connector 145 (e.g., an LC-type connector, an SC-type connector, an LX.5-type connector, an MPO-type connector, etc.). In other implementations, the first end 141 of the cable 140 may be left unterminated. The cable 140 is deployed by pulling on the first end 141 of the cable 140 to unwind the slack length 148 of the cable 140 from the spool 160. As the cable 140 is pulled, the spool 160 rotates within the enclosure 100 to unwind the cable 140.

In the example shown in FIG. 8, the cable storage spool 160 includes a bottom disc 161, a top disc 163, and a drum 162 extending therebetween. Excess length 148 of the first optical cable 140 may be wrapped around the drum 162 between the first and second discs 161, 163. In certain implementations, the drum 162 is sized to receive a spindle 116 extending upwardly from the bottom surface 111 of the base 110. The drum 162 of the spool 160 rotates about the spindle 116. In other implementations, the spool 160 otherwise rotatably mounts to the base 110

In some implementations, the spool 160 is formed from a monolithic part. In other implementations, the spool 160 is assembled from multiple parts. In certain implementations, the top disc 163 defines a central opening 164 and the drum 162 includes latching members 165 that cam through the opening 164 from the bottom and latch to a top of the top disc 163 to secure the cable storage spool 160 together. A securement member 166 mounts over the opening 164 defined in the top disc 163 and may be fastened to the spindle 116 to hold the storage spool 160 to the base 110. For example, a fastener may be inserted through a hole 167 defined in the securement member and into a hole defined in the spindle 116.

Figure 9:
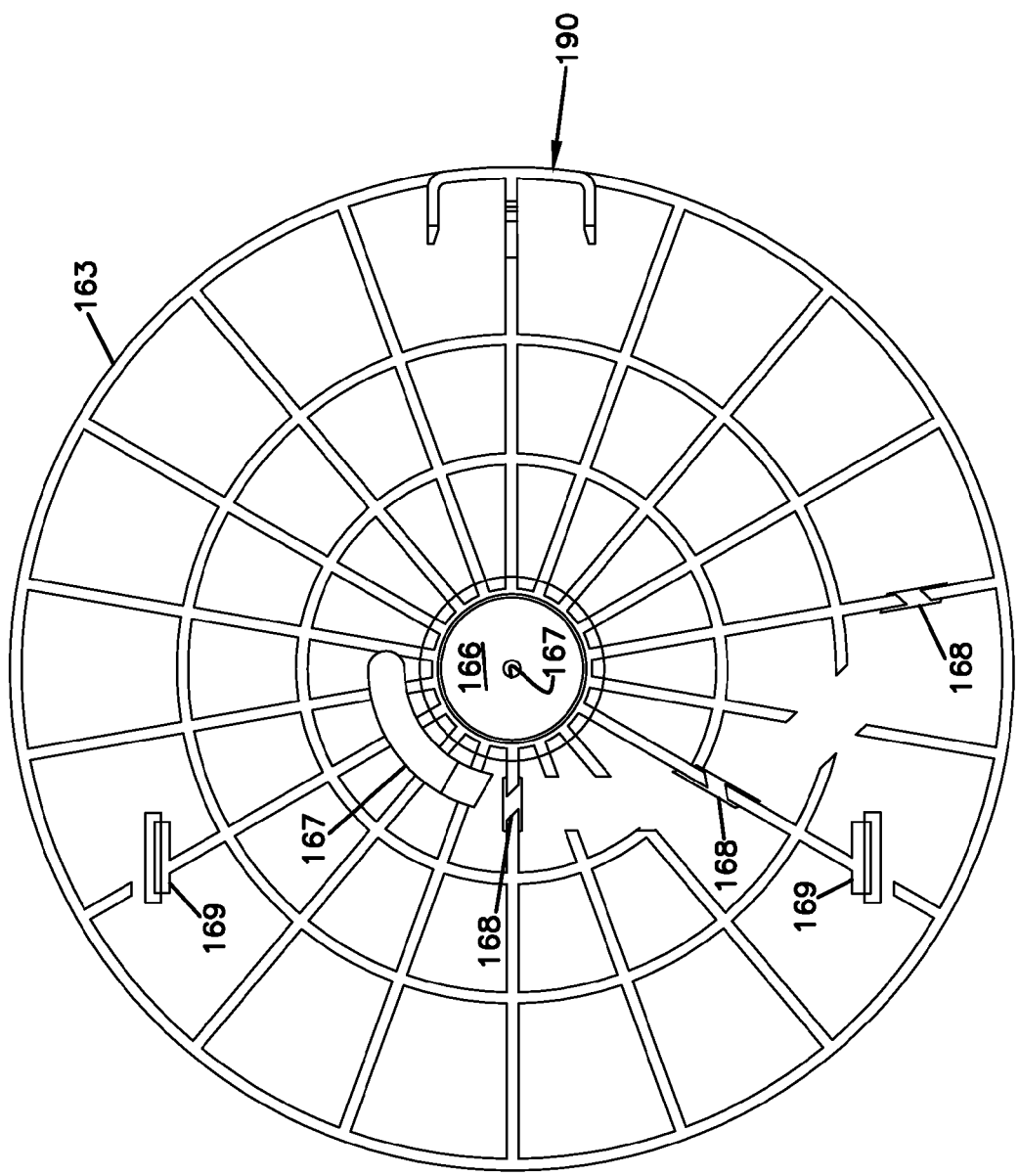
FIG. 9 is a top plan view of the drum portion of the cable spool assembly of FIG. 8.

The top disc 163 is structured and configured to enable a portion of the first optical cable 140 to be routed from the storage section of the spool 160, through the top disc 163, to at least the first tray 154. As shown in FIG. 9, the top disc 163 defines a slot 167 disposed at a radially inward section of the top disc 163. The slot 167 extends through the top disc 163. In some implementations, the slot 167 is curved to generally follow an inner diameter of the top disc 163. In other implementations, the slot 167 may have any desired shape. Slotted ribs or tabs 168 also may be provided on the top surface of the top disc 163 to aid in guiding the first optical cable 140 from the slot 167 to the tray 170.

An anchor mount 190 extends upwardly from the top disc 163. In the example shown, the anchor mount 190 is disposed at an outer radial edge of the top disc 163 (see FIGS. 8 and 9). In other implementations, the anchor mount 190 may be spaced inwardly from the outer radial edge. The anchor mount 190 includes side walls 192 extending outwardly from a wall 191. A reinforcing rib 195 may extend up a central portion of the wall 191. Openings 193 are defined in the side walls 192 for receiving one or more trays 170. The openings 193 on one of the side walls 192 align with the openings 193 on the other side wall 192 to define pivot axes for the trays 170 (e.g., see FIG. 15).

Figure 10:
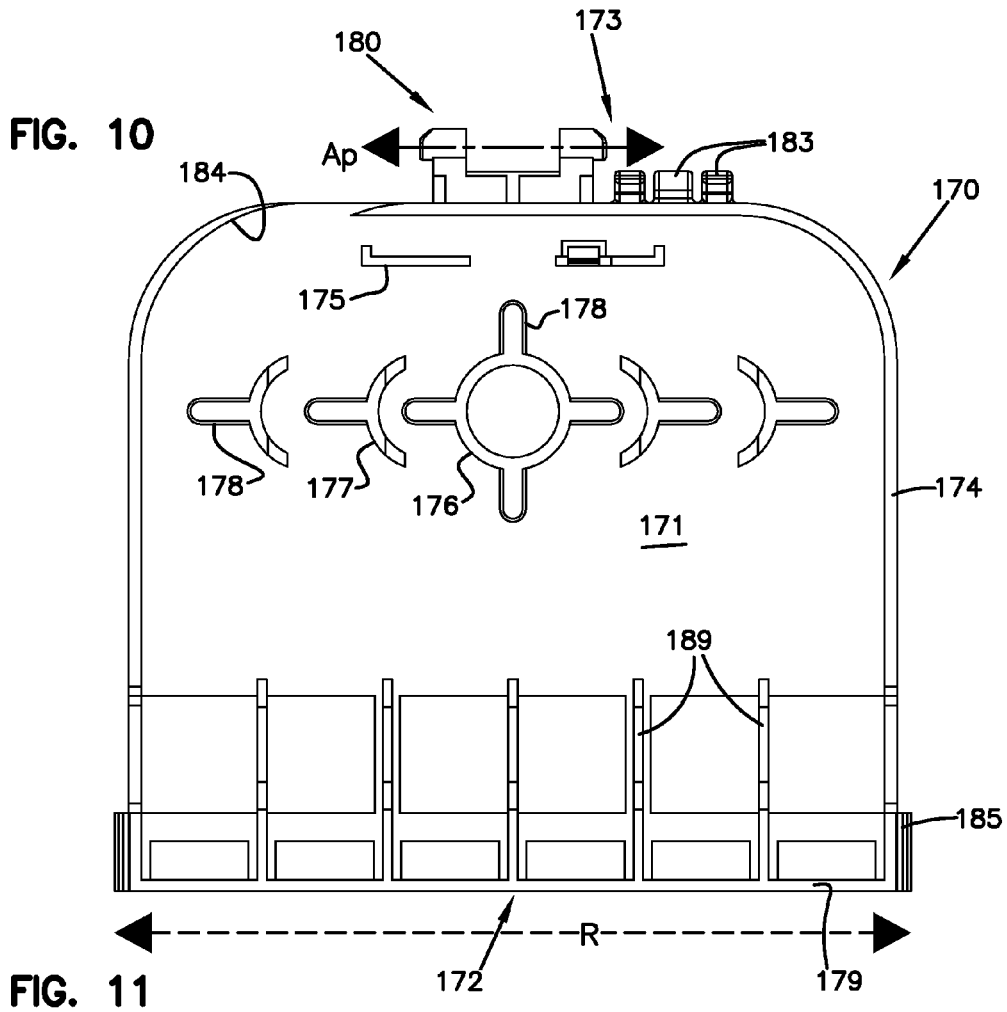
FIG. 10 is a top plan view of one of the trays of the cable spool assembly of FIG. 7.
Figure 11:
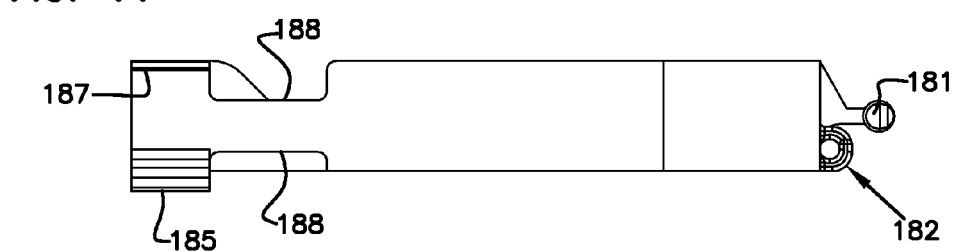
FIG. 11 is a side elevational view of the tray of FIG. 10.
Figure 12:
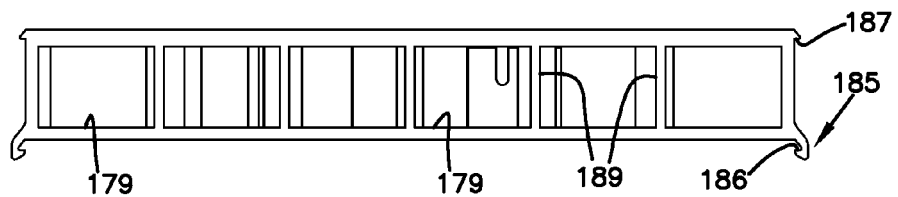
FIG. 12 is a front elevational view of the tray of FIG. 10.

FIGS. 10-12 illustrate one example tray 170 suitable for mounting to the anchor mount 190. Each tray 170 is configured to hold an optical fiber fanout 155 and at least two fiber optic adapters 158. One or more optical fibers 149 of the first optical cable 140 are received at the tray 170 from the cable spool 160 as will be described in more detail herein. The optical fibers 149 are separated at the fanout 155 and each optical fiber 149 is routed to one of the fiber optic adapters 158. A connectorized end of each optical fiber 149 is plugged into a rear port of the respective fiber optic adapter 158.

The example tray 170 includes a base 171 having a first end 172 and an opposite second end 173. Sidewalls 174 extend upwardly from the base 171 and between the first and second ends 172, 173. In the example shown, the side walls 174 curve inwardly at the second end 173 of the tray 170. The tray 170 has a fanout mounting section 175, a fiber storage section, and an adapter mounting section 179. In the example shown, the adapter mounting section 179 is disposed at the first end 172 of the tray 170 and the fanout mounting section 175 is disposed at the second end 173. The cable storage section is disposed between the fanout mounting section 175 and the adapter mounting section 179.

One or more optical fiber guides are provided at the fiber storage section to guide optical fibers from the fanout mounting section 175 to the adapter mounting section 179 and to store slack length therebetween. In the example shown, a fiber spool 176 and multiple bend radius limiters 177 are disposed at the fiber storage section. One or more tabs 178 extend outwardly from the fiber spool 176 and/or the bend radius limiters 177. In the example shown, two bend radius limiters 177 are disposed on either side of a central spool 176. In other implementations, however, the fiber storage section may include multiple spools 176 or a greater or fewer number of bend radius limiters 177.

A row of one or more fiber optic adapters 158 are mounted at the adapter mounting section 179. Each fiber optic adapter 158 has first and second ports. The first ports face outwardly from the first end 172 of the tray 170 and the second ports face towards the second end 173 of the tray 170. In the example shown in FIGS. 4-7, twelve fiber optic adapters 158 are disposed at the adapter mounting section 179. In other implementations, a greater or lesser number of fiber optic adapters 158 may be provided (e.g., two adapters, six adapters, eight adapters, ten adapters, sixteen adapters, twenty-four adapters, etc.).

In the example shown in FIGS. 10 and 12, one or more flanges 189 define the mounting structure at the adapter mounting section 179. As shown in FIGS. 4-7, two fiber optic adapters 158 may be mounted between adjacent flanges 189. In other implementations, a single adapter 158 may be disposed between adjacent flanges. In still other implementations, the adapters 158 may be formed as a unitary part and secured to the tray 179 at the adapter mounting section 179.

Figure 13:
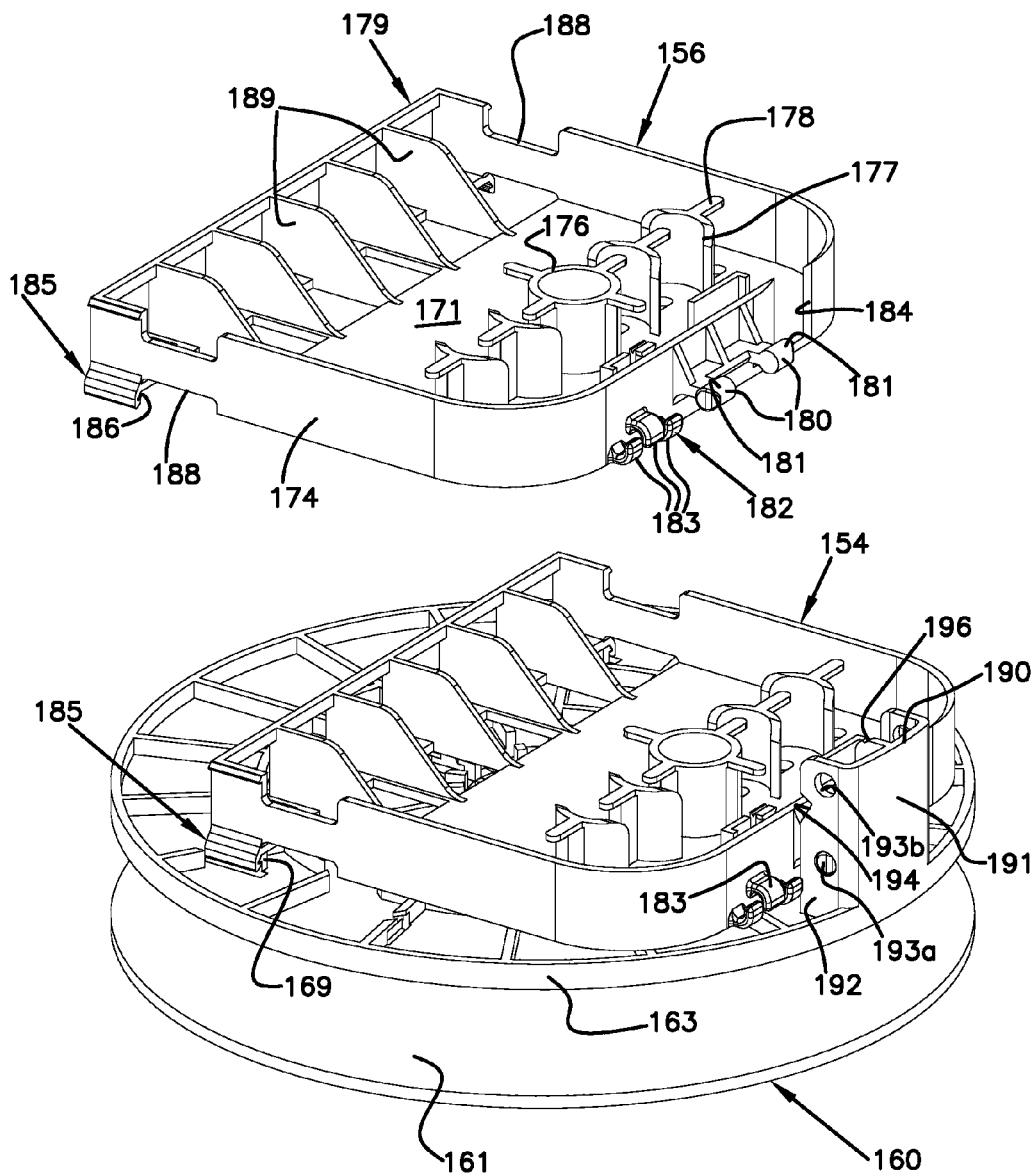
FIG. 13 is a top, rear perspective view of the cable spool assembly of FIG. 7 with the top tray exploded outwardly from the drum.
Figure 14:
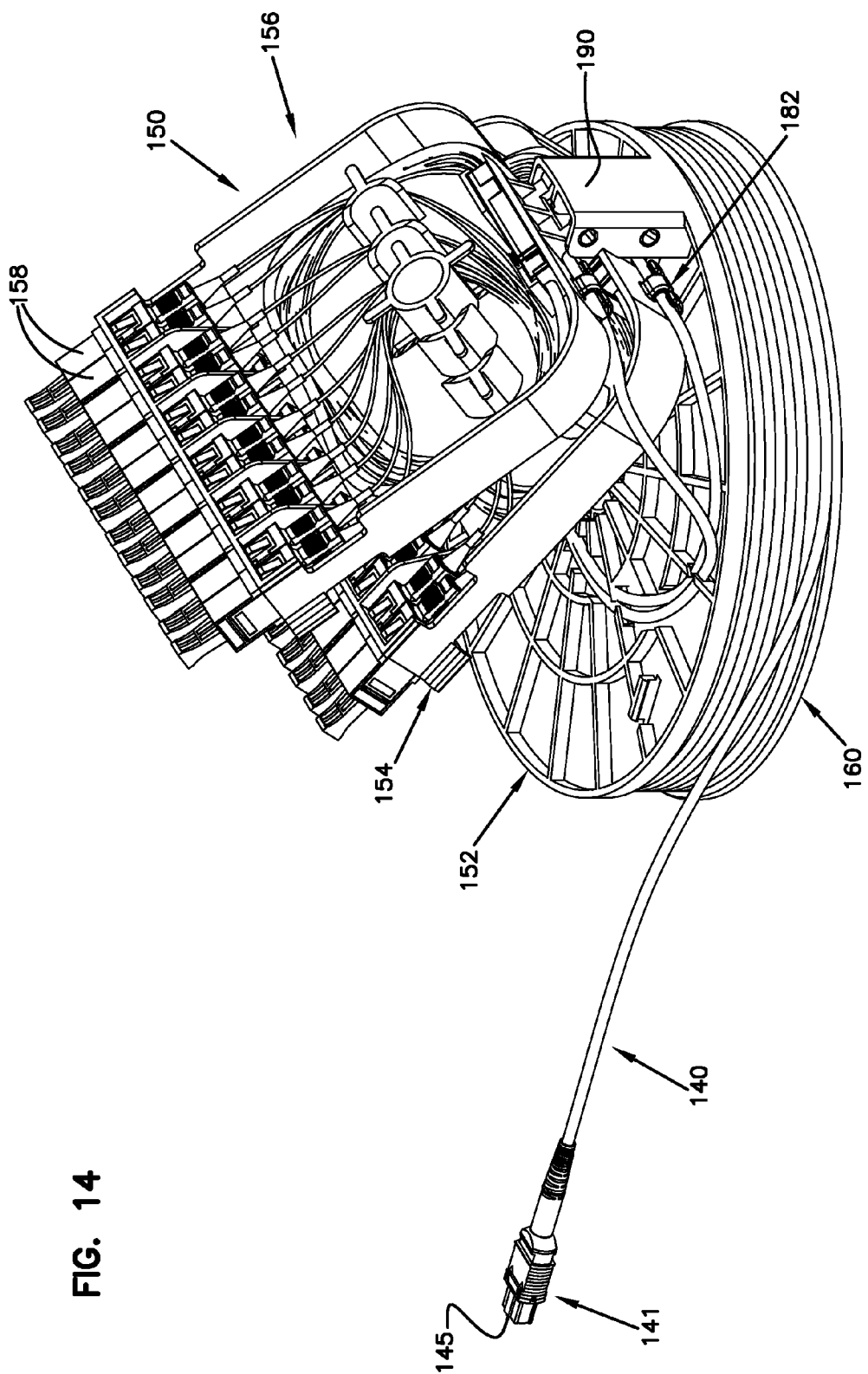
FIG. 14 is a top rear perspective view of the cable spool assembly of FIG. 7.
Figure 15:
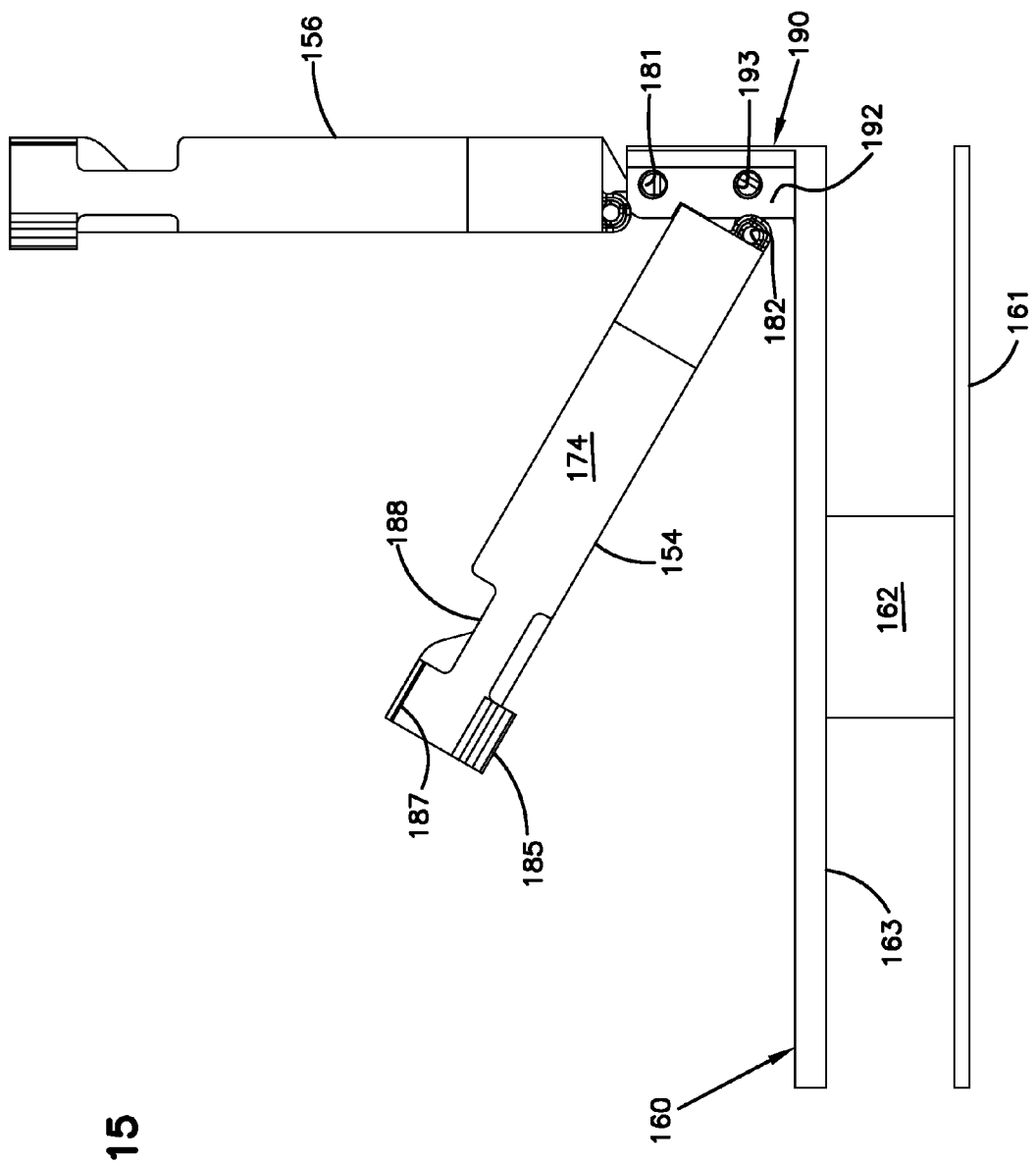
FIG. 15 is a side elevational view of the cable spool assembly of FIG. 7 with the first tray disposed in a raised position and the second tray disposed in a partially raised position.

As shown in FIG. 13, a hinge member 180 is provided at the second end 173 of the tray 170. The hinge member 180 includes pivot members 181 that are configured to mount in the openings 193 of the anchor mount 190. In the example shown, the hinge member 180 includes first and second pivot members 181 forming a pivot axis $A_P$. In other implementations, the hinge member 180 may form a single pivot member 181 that is sufficiently long to extend between both openings 193. In the example shown, the hinge member 180 is disposed at a generally central section of the second end 173 of the tray 170. In other implementations, the hinge member 180 may be offset from the center.

In some implementations, a cable guide 183 is disposed at the second end 173 of the tray 170. The cable guide 183 defines a channel through which one or more optical fibers or fiber cables may pass when routed from the cable spool 160 to the tray 170. In the example shown, the cable guide 183 is formed by three curved fingers. In other implementations, the cable guide 183 may be formed by a channel, a tube, tabs, or other retaining structures. The cable guide 183 is spaced laterally from the hinge member 180 sufficient to allow the tray 170 to pivot relative to the anchor mount 190 without interference from the cable guide 183.

The second end 173 of the tray 170 also defines a slot 184 through which the optical fibers or cable may enter the tray 170. The slot 184 is defined at an opposite side of the hinge member 180 from the cable guide 183. The cable guide 183 is disposed sufficiently close to the second end 173 of the tray 170 and the hinge member 180 projects sufficiently far from the second end 173 of the tray 170 to enable the optical fibers or cable to pass between the second end 173 of the tray 170 and the anchor mount 190 when routed from the cable guide 183 to the slot 184 (See FIG. 10).

In the example shown in FIG. 13, the anchor mount 190 includes a first set of openings 193a and a second set of openings 193b. The second set of openings 193b are spaced upwardly from the first set of openings 193a. A first tray 154 is mounted to the anchor mount 190 at the first set of openings 193a. A second tray 156 is configured to be mounted to the anchor mount 190 at the second set of openings 193b. The second tray 156 is configured to be generally parallel to the first tray 154 when both trays 170 are in a first position.

Each tray 170 is configured to pivot about the pivot axis AP between raised and lowered positions. The base 171 of each tray 170 is generally parallel to the top disc 163 of the cable spool 160 and the bottom surface 111 of the base 110 when the tray 170 is in the lowered position (e.g., see FIG. 4). The base 171 of the top tray 154 is generally perpendicular to the top disc 163 of the cable spool 160 and the bottom surface 111 of the base 110 when the tray 154 is in the raised position (e.g., see FIGS. 5 and 15). The base 171 of the bottom tray 156 is angled (e.g., between 0° and 90°) relative to the top disc 163 of the cable spool 160 and the bottom surface 111 of the base 110 when the tray 156 is in the raised position (e.g., see FIGS. 5 and 15).

The cable ports 132, 133 of the enclosure 100 are structured to facilitate moving the trays 170 to the raised positions even after the subscriber fibers have been routed into the enclosure and plugged into front ports of the adapters 158. The cable ports 132, 133 are formed by slots in the front 103 of the enclosure housing 100. Accordingly, when the enclosure 100 is open and the top tray 156 is pivoted to the raised position, the subscriber fibers plugged into the adapters 158 of the top tray 156 may lift out of the slots 132 of the enclosure. Further, the subscriber fibers may slide back into the slots 132 when the top tray 156 is pivoted to the lowered position. The subscriber fibers plugged into the lower tray 156 may slide in and out of the slots 132 in a similar manner.

In certain implementations, the anchor mount 190 is structured to allow the lower tray 170 to pivot upwardly, but to inhibit the lower tray 154 from pivoting too far towards the top tray 156. Allowing the bottom tray 154 to pivot upwardly provides selective access to the top surface of the cable spool 160 (e.g., and optical fibers and cables routed across the same) after the trays 170 are attached to the spool 160. In the example shown, each side wall 192 of the anchor mount 190 defines a notch 194 that receives a top edge of the side wall 174 of the tray 170 when the bottom tray 154 is moved to its raised position (see FIG. 15). The notch 194 accommodates limited movement of the bottom tray 154.

In some implementations, the trays 170 are configured to be locked, latched, or otherwise secured in the lowered position. For example, as shown in FIGS. 11 and 12, certain types of trays 170 include latches 185 at a bottom of the tray 170 on one or both sides of the tray 170. In the example shown, the latches 185 are disposed at a bottom of the first end 172 of the tray 170. Each latch 185 defines an inner flexible hook 186. The latches 185 of the lower tray 154 are configured to secure to latching structures 169 disposed at a top of the spool 160 (e.g., see FIG. 13). In the example shown, the top disc 163 of the spool 160 includes two latching structures 169.

As shown in FIGS. 11 and 12, each tray 170 also includes a second latching structure 187 at a top of the first end 172 of the tray 170. The second latching structure 187 includes a ramp and shoulder over which the latch member 185 of another tray 170 may cam and hook. For example, the latch member 185 of the top tray 156 of FIG. 13 is configured to snap over the second latching structure 187 of the bottom tray 154. The latch member 185 of the bottom tray 154 is configured to snap over the latching structure 169 of the cable spool 160.

Since the latches 185 are flexible, a tray 170 secured in the lowered position may be moved to the raised position by applying a minimal force to the tray 170. Each tray 170 defines a finger gripping portion 188 at which a user may apply the force. In the example shown, the finger gripping portion 188 is defined by top and bottom recesses in the sidewall 174 of the tray 170. In other implementations, each tray 170 may include a protruding grip section.

Figure 16:
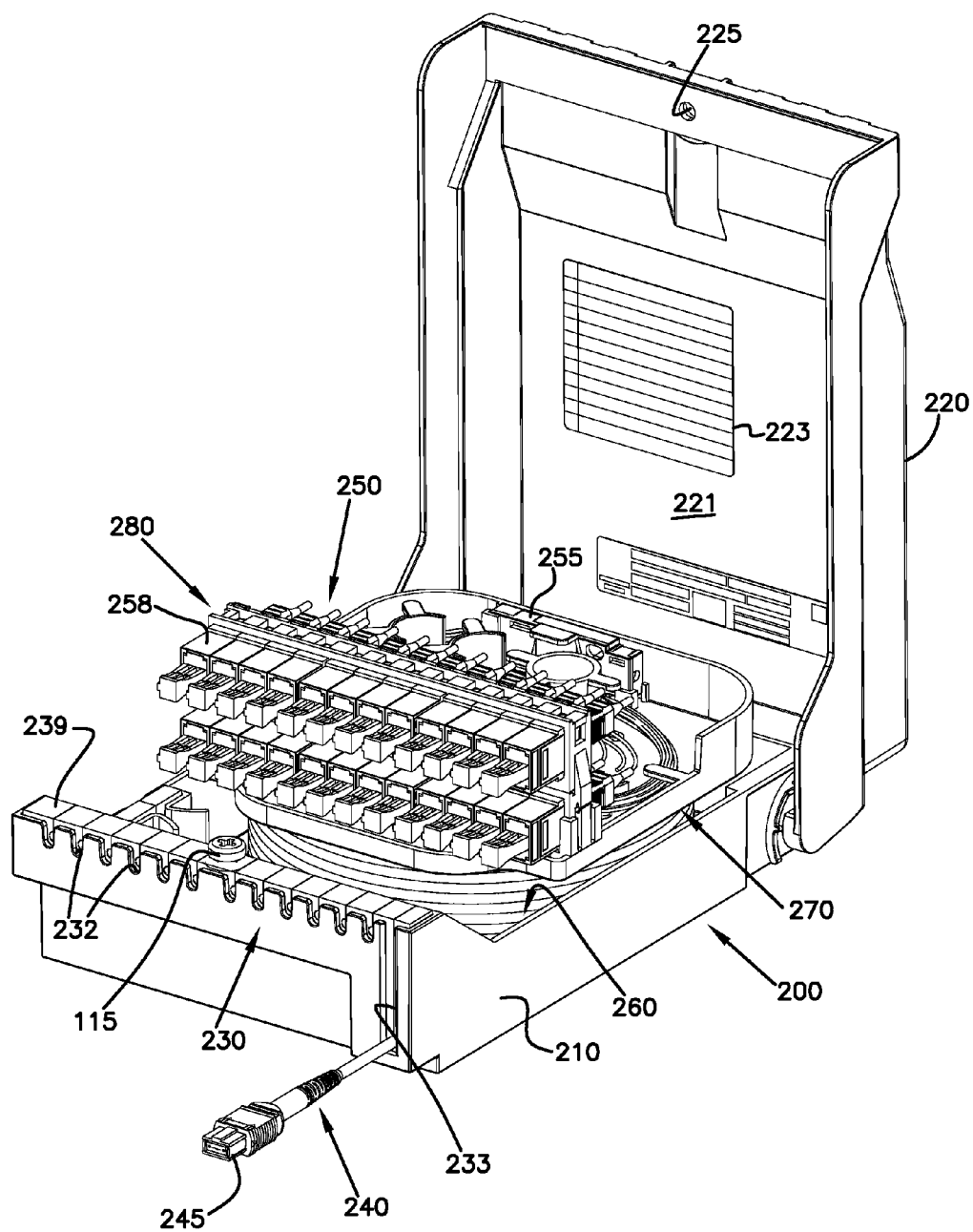
FIG. 16 is a top, front perspective view of another example fiber optic enclosure including a drum suitable for storing slack length of a fiber optic cable and a tray coupled to multiple rows of optical adapters.
Figure 17:
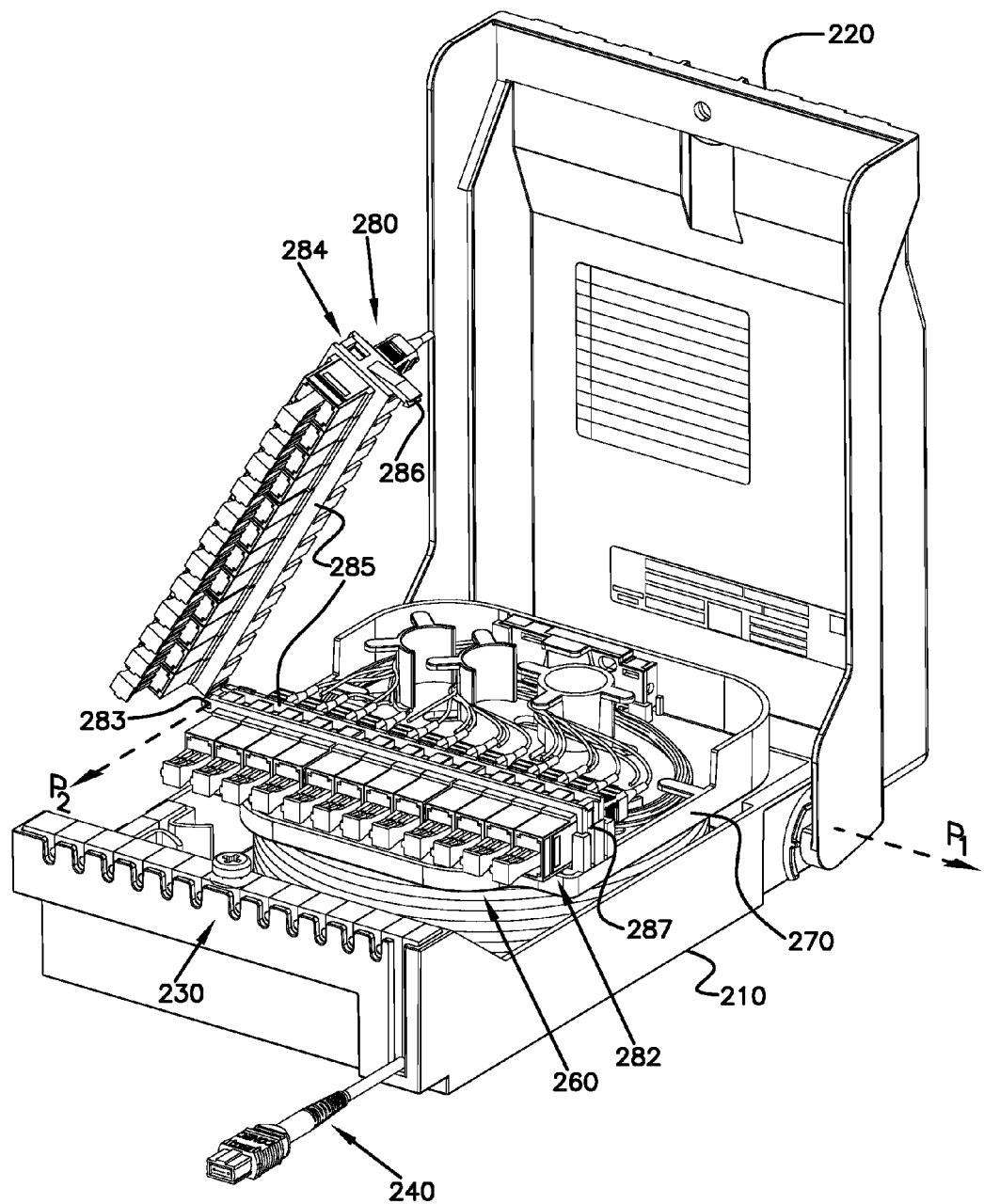
FIG. 17 is a top, front perspective view of the example fiber optic enclosure of FIG. 16 with a top row of adapters pivoted away from a bottom row of adapters in accordance with aspects of the disclosure.

FIGS. 16 and 17 illustrate another example implementation of an enclosure 200 that is suitable for connecting at least a first optical cable to at least one subscriber fiber as described above. The enclosure 200 houses a cable spool assembly 250. The enclosure 200 includes a base 210 and a cover 220. The cover 220 is moveable (e.g., pivotable, rotatable, etc.) between open and closed positions. Labels 223 may be disposed on an inner surface 221 of the cover 220. The base 210 and cover 220 may define locking openings 215, 225 through which a fastener or lock may extend to hold the cover 220 in a closed position relative to the base 210.

The base 210 includes a front portion 230 defining subscriber fiber ports 232 and a main cable port 233. In certain implementations, the ports 232, 233 define slots extending downwardly from the top of the base 210 at the front of the base 210. In some implementations, each subscriber fiber port 232 is sized to receive a single optical fiber. In other implementations, each subscriber fiber port 232 is sized to receive multiple optical fibers. In the example shown, the main cable port 233 is longer than any of the subscriber fiber ports 232. In the example shown, the front portion 230 defines twelve subscriber fiber ports 232 and one main cable port 233. In other implementations, a greater or lesser number of subscriber ports 232 and/or main ports 233 may be provided.

A gasket 239 or other sealing material may be provided at the front portion 230 to seal the subscriber ports 232. In certain implementations, the gasket also may seal the main cable port 233. In certain implementations, the gasket 239 is disposed between two walls of the front portion 230. One example of a suitable gasket 239 is a slotted foam wall. In the example shown, the locking opening 215 of the base 210 extends through the gasket at the front portion 230.

The cable spool assembly 250 includes a drum portion 260 and a tray assembly 270 mounted to the drum portion 260. The drum portion 260 includes a cable storage spool that rotatably mounts to the base 210. The cable storage spool is configured to receive excess length of an optical fiber cable 240. One or more cables 240 may be deployed by pulling on a first end (e.g., a connectorized end 245 disposed outside of the enclosure 200) of each cable 240 to unwind the slack length of the cable 240 from the spool 260. As the cable 240 is pulled, the spool 260 rotates within the enclosure 200 to unwind the cable 240.

The tray assembly 270 includes a tray that is configured to rotate in unison with the drum portion 260 of the cable assembly 250 when the cable spool assembly 250 is rotated relative to the base 210. In the example shown, the tray assembly 270 includes a single tray that is fixedly mounted to a top of the spool 260. The tray does not pivot relative to the spool 260.

The tray has a first end and an opposite second end that both extend parallel to the front and rear walls of the enclosure 200. The first end of the tray is disposed closer to the front of the enclosure 200 and the second end of the tray is disposed closer to the rear of the enclosure 200 when the cable spool assembly 250 is configured to connect subscriber fibers to the main optical fiber cable 240. The tray is configured to receive optical fibers from the drum portion at the second end of the tray. The tray also includes a termination region 280 at which two or more fiber optic adapters 158 are disposed.

In the example shown, the termination region 280 includes a first row 282 of optical adapters 158 extending along the first end of the tray and a second row 284 of optical adapters 158 extending along the first end of the tray. In the example shown, each row 282, 284 includes twelve optical adapters 158. In other implementations, however, each row 282, 284 may include a greater or lesser number of optical adapters 158.

The second row 284 of optical adapters 158 is pivotally connected to the first row 282 of optical adapters 158. The second row 284 of optical adapters 158 is configured to pivot between lowered and raised positions relative to the first row 282 of optical adapters 158. For example, FIG. 16 shows the second row 284 is the lowered position and FIG. 17 shows the second row 284 is the raised position. When the second row 284 is disposed in the lowered position, the front ports of the adapters 158 of both rows 282, 284 align with the subscriber fiber ports 232 at the front portion 230 of the enclosure 200. Moving the second row 284 of optical adapters 158 to the raised position provides access to the optical adapters 158 of the first row 282.

In certain implementations, the second row 284 is stacked on top of the first row 282. A first side of the second row 284 is pivotally coupled to a first side of the first row 282 so that an opposite second side of the second row 284 pivots away from an opposite second side of the first row 282 when the second row 284 is moved to the raised position. The second row 284 is pivoted about an adapter pivot axis P2 defined by a hinge pin 283 that extends parallel to an insertion axis of the optical adapters 158 of the first and second rows 282, 284. In certain implementations, the adapter pivot axis P2 is generally orthogonal to a first pivot axis P1 about which the cover 220 pivots relative to the base 210 of the enclosure 200.

In certain implementations, the second row 284 of optical adapters 158 is configured to latch to the first row 282 of optical adapters 158 to hold the second row 284 of optical adapters 158 in the lowered position in which the first row 282 extends generally parallel to the second row 284. In the example shown, the top row 284 of adapters 158 includes a flexible latching finger 286 that extends downwardly. The flexible latching fiber 286 is configured to engage a latching structure 287 disposed on the first row 282 of adapters 158. In the example shown, the flexible latching finger 286 and the latching structure 287 are disposed at the second sides of the rows 282, 284, respectively.

The above specification, examples and data provide a complete description of the manufacture and use of the composition of the invention. Various modifications and alterations of this disclosure will become apparent to those skilled in the art without departing from the scope and spirit of this disclosure, and it should be understood that the scope of this disclosure is not to be unduly limited to the illustrative embodiments set forth herein. Accordingly, the invention resides in the claims hereinafter appended.

What is claimed is:

1. A fiber optic enclosure comprising:
 a housing including a base and a cover that cooperatively define an interior region of the housing;
 a cable spool assembly disposed in the interior region of the housing, the cable spool assembly being rotatably engaged to the base, the cable spool assembly including:
  a drum portion; and
  a tray assembly engaged to the drum portion, the tray assembly including at least a first tray and a second tray, each tray of the tray assembly having a first end and an opposite second end, each tray being pivotal along a pivot axis relative to the drum portion between respective raised and lowered positions, the pivot axis extending along a second end of the tray opposite the respective first end, the tray assembly being configured to rotate in unison with the drum portion when the cable spool assembly is rotated relative to the base.

2. The fiber optic enclosure of claim 1, further comprising a fiber optic distribution cable wrapped around the drum portion of the cable spool assembly.

3. The fiber optic enclosure of claim 1, wherein the second tray is disposed in a stacked configuration relative to the first tray.

4. The fiber optic enclosure of claim 1, wherein the tray assembly also includes a third tray that is pivotally coupled to the drum portion, the third tray being pivotal relative to the first tray and relative to the second tray.

5. The fiber optic enclosure of claim 4, wherein the third tray is disposed in a stacked configuration relative to the first and second trays.

6. The fiber optic enclosure of claim 1, wherein a hinge arrangement extends upwardly from the drum portion, and wherein each tray of the tray assembly is pivotally mounted to the hinge arrangement.

7. The fiber optic enclosure of claim 6, wherein the first tray is pivotally mounted to the hinge arrangement at a first location and wherein a second tray is pivotally mounted to the hinge arrangement at a second location, wherein the first location is disposed between the second location and the drum portion.

8. The fiber optic enclosure of claim 1, wherein each tray includes a fanout disposed at the second end of the tray, the fanout separating a respective optical cable into connectorized optical fibers.

9. The fiber optic enclosure of claim 8, wherein the second end of each tray of the tray assembly defines a cable entrance through which the respective optical cable extends when routed from the drum portion and onto the tray.

10. The fiber optic enclosure of claim 1, further comprising a cable guide disposed at the second end of the first tray, the cable guide defining a channel through which an optical fiber may enter the first tray.

11. A fiber optic enclosure comprising:
a base;
a cable spool rotatably coupled to the base, the cable spool having a drum around which an optical cable can be wound;
a first plurality of adapters carried by the cable spool as a first unit, the first plurality of adapters rotating unitarily with the cable spool when the cable spool rotates relative to the base; and
a second plurality of adapters carried by the cable spool as a second unit, the second plurality of adapters rotating unitarily with the cable spool when the cable spool rotates relative to the base, the second plurality of adapters as the second unit being pivotally movable relative to the first unit of the first plurality of adapters between a raised position and a lowered position.

12. The fiber optic enclosure of claim 11, further comprising a cover coupled to the base to enclose the cable spool, the first plurality of adapters, and the second plurality of adapters.

13. The fiber optic enclosure of claim 12, wherein the cover is pivotally mounted to the base.

14. The fiber optic enclosure of claim 11, wherein the second plurality of adapters is stacked over the first plurality of adapters.

15. The fiber optic enclosure of claim 11, wherein the first plurality of adapters is pivotally movable relative to the cable spool.

16. The fiber optic enclosure of claim 11, wherein the second plurality of adapters is configured to latch to the first plurality of adapters to hold the second plurality of adapters in the lowered position.

17. The fiber optic enclosure of claim 16, wherein the second plurality of adapters extends generally parallel to the first plurality of adapters when disposed in the lowered position.

18. The fiber optic enclosure of claim 11, wherein each plurality of adapters includes twelve adapters.

19. The fiber optic enclosure of claim 11, further comprising a fiber optic distribution cable wrapped about the drum of the cable spool.

20. The fiber optic enclosure of claim 11, wherein the drum includes a spindle extending between two end flanges.

* * * * *